Dec. 15, 1936.    M. BIRD    2,064,407

METHOD OF MAKING CIRCULAR SAWS

Filed Sept. 19, 1934

INVENTOR.
MYRON BIRD
BY
ATTORNEY

Patented Dec. 15, 1936

2,064,407

UNITED STATES PATENT OFFICE 2,064,407

METHOD OF MAKING CIRCULAR SAWS

Myron Bird, San Francisco, Calif.

Application September 19, 1934, Serial No. 744,708

2 Claims. (Cl. 76—112)

The present invention relates particularly to saws, the body portions of which are made out of stainless steel, Monel metal, or the like, and having a cutting edge formed of an extremely hard alloy.

An object of the invention is to provide a saw having an extremely hard rim on which is formed a toothed edge built up on a relatively thin disc, the said disc and rim being slotted at spaced points, to prevent warpage or fracturing of the disc metal and rim when building up the rim on the disc, due to the different coefficients of expansion and contraction between the metals comprising the rim and the disc.

A further object of the invention is to provide a circular saw formed of a body of metal which is provided with slots therein at spaced circumferential points, a hard alloy rim being built up on the segments between the slots, and onto which the cutting teeth of the saw are ground, the slots in the disc and rim permitting the said disc and rim to expand or contract when the hard alloy rim is being built thereon, to forestall cracking or fracturing of the saw body or of the rim.

Other objects and advantages are to provide a circular saw that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
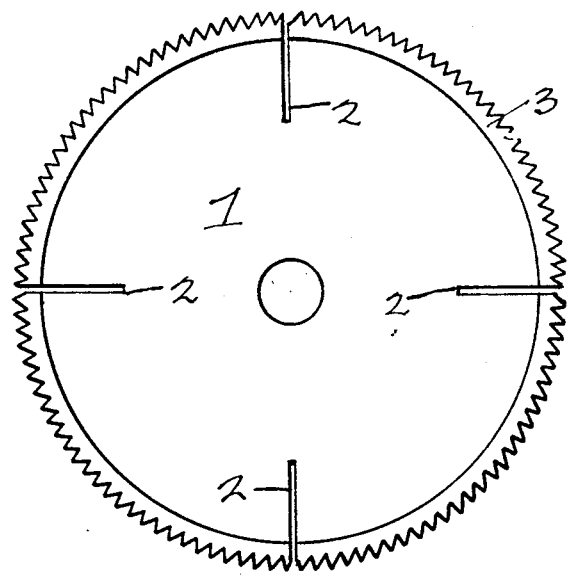
Fig. 1 is a front elevation of a completed circular saw constructed in accordance with my invention.
Figure 2:
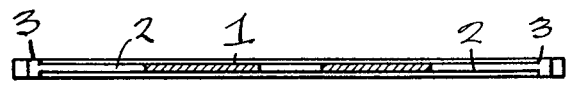
Fig. 2 is a cross section taken through Fig. 1.

A form of apparatus for making saws in accordance with my invention is substantially indicated in the United States patent to Bem, No. 1,919,358. In this patent a metal disc comprising the body of the saw, has a continuous rim of hard metal alloy built up around the edge thereof.

The hard alloys useful in this connection are such as sold under the various trade names, Stellite, Stoodite, Christie, Carboloy, etc., and which are thought to be compounds respectively of chromium, cobalt, molybdenum or tungsten,—chromium and iron carbide—tungsten, molybdenum and chromium—tungsten, chromium, carbon and cobalt. The various disc bodies used were of common saw steel, cold rolled steel; Monel metal, and stainless steel.

I have found where the saw body is made of stainless steel or like metals, having a high chromium or chromium nickel content, that in the process of building up the continuous hard alloy edging around the disc, the body of the disc tends to crack or fracture, due unquestionably, to the different coefficients of expansion of the metals in the saw body and of the hard alloy agent. In order to prevent this fracturing or cracking of the body of the saw disc 1, in accordance with my invention, I provide a series of radial slots 2, at spaced circumferential points around the disc. The alloy is built up around the edge of the disc 1, on the segments between the slots 2, and the thickness or width of the alloy is made slightly in excess of that of the thickness of the body of the saw. The interrupted alloy rim is indicated in the drawing by the numeral 3, and in the finishing process, the teeth of the saw are ground therein.

In building the alloy rim on the segmental edge of a disc of stainless steel or other metal rich in chromium or chromium-nickel content, the slots 2 in the body of the saw disc permit the circumferential portions of the rim of the disc to expand when the alloy rim is being built thereon, and to contract as the heat of the built up rim dissipates. When the alloy rim has been built up clear around the segmental edge of the disc, then the disc and rim are ground on both sides while leaving the rim just a trifle thicker for clearance in use, after which the outer edge of the disc is formed in a true circle, and the cutting teeth are ground in the alloy rim.

In the Bem patent it is stated that there is a certain amount of contraction when the built up alloy rim cools, and that it is desirable to stretch the margin of the disc onto which the rim is to be welded, by lightly peening the same, but I have found that where the saw body is made of stainless steel or like material, that the disc body cracks invariably when it cools, after having had the hard alloy rim added thereto.

I have found that by slotting the saw body in advance, when stainless steel or like metal is used, that the finished product is free of undesirable cracks or other defects, in the body of the saw or the hard alloy rim.

Having thus described this invention, what I claim and desire to secure by Letters Patent is:

1. The process of making a circular saw which comprises taking a flat body disc of non-corrosive metal and cutting radially disposed slots around the circumference thereof and building up teeth of hard metal alloy around the circumference of the disc, and integrally uniting the same thereto by a process of welding from the molten alloy.

2. The process of making a circular saw which comprises taking a flat body disc of non-corrosive metal and cutting radially disposed slots around the circumference thereof, and building up teeth of Stellite around the circumference of the disc and integrally uniting the same thereto by a process of welding from the Stellite.

MYRON BIRD.